United States Patent
Morisawa (10) Patent No.: US 6,832,311 B2
(45) Date of Patent: Dec. 14, 2004

(54) INFORMATION PROCESSING SYSTEM AND RESUME PROCESSING METHOD USED IN THE SYSTEM

(75) Inventor: Toshikazu Morisawa, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 645 days.

(21) Appl. No.: 09/942,751

(22) Filed: Aug. 31, 2001

(65) Prior Publication Data

US 2002/0038328 A1 Mar. 28, 2002

(30) Foreign Application Priority Data

Sep. 25, 2000 (JP) ........................................ 2000-291171

(51) Int. Cl.[7] .............................. G06F 1/24; G06F 1/30
(52) U.S. Cl. .............................. 713/1; 713/2; 713/100; 713/300; 710/10
(58) Field of Search .............................. 710/10; 713/1, 713/2, 100, 300

(56) References Cited

U.S. PATENT DOCUMENTS 5,694,583 A * 12/1997 Williams et al. .............. 703/24
6,385,721 B1 * 5/2002 Puckette ......................... 713/2
6,393,584 B1 * 5/2002 McLaren et al. .............. 714/14
6,681,336 B1 * 1/2004 Nakazato et al. ........... 713/322
6,691,234 B1 * 2/2004 Huff ........................... 713/300

FOREIGN PATENT DOCUMENTS

JP    11-73330    3/1999

* cited by examiner

*Primary Examiner*—Rehana Perveen
(74) *Attorney, Agent, or Firm*—Finnegan, Henderson, Farabow, Garrett & Dunner, L.L.P.

(57) ABSTRACT

A first resume process executed by the BIOS program is divided into two sections. When a resume sub-process, included in the first resume process, for resuming the operating environment of a system core necessary for operating the operating system, has been executed, system control is switched from the BIOS program to the operating system. After that, interrupt processes are inserted while the operating system is executing the second resume process. In the interrupt processes, the BIOS program executes the remaining sub-processes of the first resume process.

15 Claims, 10 Drawing Sheets

INFORMATION PROCESSING SYSTEM AND RESUME PROCESSING METHOD USED IN THE SYSTEM

CROSS-REFERENCE TO RELATED APPLICATIONS

This application is based on Japanese Patent Application No. 2000-291171, filed Sep. 25, 2000, the contents of which is incorporated herein by reference.

BACKGROUND OF THE INVENTION

1. Field of the Invention

The present invention relates to an information processing system and a resume processing method employed in the system, and more particularly to an information processing system capable of resuming its operating environment at the point at which execution was suspended, and a resume processing method employed in the system.

2. Description of the Related Art

Various types of portable computers that can be driven by a battery, e.g. notebook-type personal computers, PDAs, etc., have been developed recently. These computers have a power save mode (sleep mode) for reducing the power consumption. A suspend mode is a least power consuming sleep mode. When a computer system is in suspend mode, almost all devices incorporated therein, except for a memory that stores system data necessary for resuming its operating environment, are powered off.

The system data saved in the memory concerns the status of the CPU and various devices. Further, the memory also stores the status of the operating system and application programs, and user data created by the application programs. When the suspended system is again powered on, the system data saved in the memory is restored, thereby resuming the operating environment at the point at which execution was suspended.

The system data is saved by a suspend routine included in a BIOS (Basic Input Output System). The BIOS is provided for controlling the hardware of the system in accordance with commands from the operating system, and includes device drivers for controlling various hardware devices in the system. The suspend routine in the BIOS is activated when, for example, the power switch of the system is turned off, thereby saving the status of the register of the CPU and those of various peripheral LSIs, before the computer is completely powered off. The supply of power to the memory is continued, using a battery, during the power-off state of the system. This enables the status of the system and the user data, and hence enables the system to be restored to the pre-suspended state.

However, a technique represented by, for example, ACPI (Advanced Configuration and Power Interface) has been developed recently, which imparts a function of power management to the operating system (OS) of the system. In this technique, the suspend/resume process is executed by the cooperation of the OS and the BIOS under the control of the OS. More specifically, the resume process is executed in two stages—the first resume process is executed by the BIOS and the next resume process is executed by the OS.

In the BIOS resume process, the OS and each device under the control of the OS are restored to respective operation-guaranteed states. Thereafter, the system control is switched from the BIOS to the OS, and resume processing under the control of the OS is started. As a result of this resume process, each device is restored to its original state assumed before its operation was suspended.

However, computer systems are generally comprised of a large number of devices. Therefore, in a resume mechanism in which the OS resume process is executed after the BIOS resume process for all the devices is completed, the OS resume process cannot be started even on a device having been subjected to the BIOS resume process, unless all the devices are subjected to the BIOS resume process. This means that a long pause occurs and hence a lot of time is required for restoring the system.

BRIEF SUMMARY OF THE INVENTION

It is the object of the present invention to provide an information processing system and a resume processing method used therein, which requires a short time to restore the system to its normal operation mode from a power save mode, such as a suspend mode.

To attain the object, there is provided an information processing system capable of resuming an operation, by using system data saved in a memory immediately before the system was suspended, comprising: means, responsive to occurrence of a wakeup event while the system is in a suspended state, for causing a BIOS program to execute a resume sub-process to restore an operation environment of a system core necessary to operate an operating system, the resume sub-process being included in a first resume process executed by the BIOS program; means, responsive to completion of the resume sub-process, for causing the operating system to start execution of a second resume process for restoring an operating environment of each of devices other than the system core; and means for inserting interrupt processes in which the BIOS program executes a remaining resume sub-process of the first resume process, into the second resume process, so as to execute the remaining resume sub-process and the second resume process in a parallel manner, the remaining resume sub-process including a preprocess for enabling the devices to be subjected to the second resume process.

In this system, the first resume process executed by the BIOS program is divided into two sections. When a resume sub-process, included in the first resume process, for restoring the operating environment of a system core necessary for operating the operating system, has been executed, system control is switched from the BIOS program to the operating system. After that, interrupt processes are inserted the second resume process. In the interrupt processes, the BIOS program executes the remaining sub-processes of the first resume process. As a result, the remaining sub-processes of the first resume process and the second resume process by the operating system are executed in a parallel manner. This can shorten the time required for the entire resume process, compared to a sequential process in which the operating system can only execute the second resume process after the BIOS has completed the first resume process on all the related devices.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

An embodiment of the present invention will be described with reference to the accompanying drawings.

Figure 1:
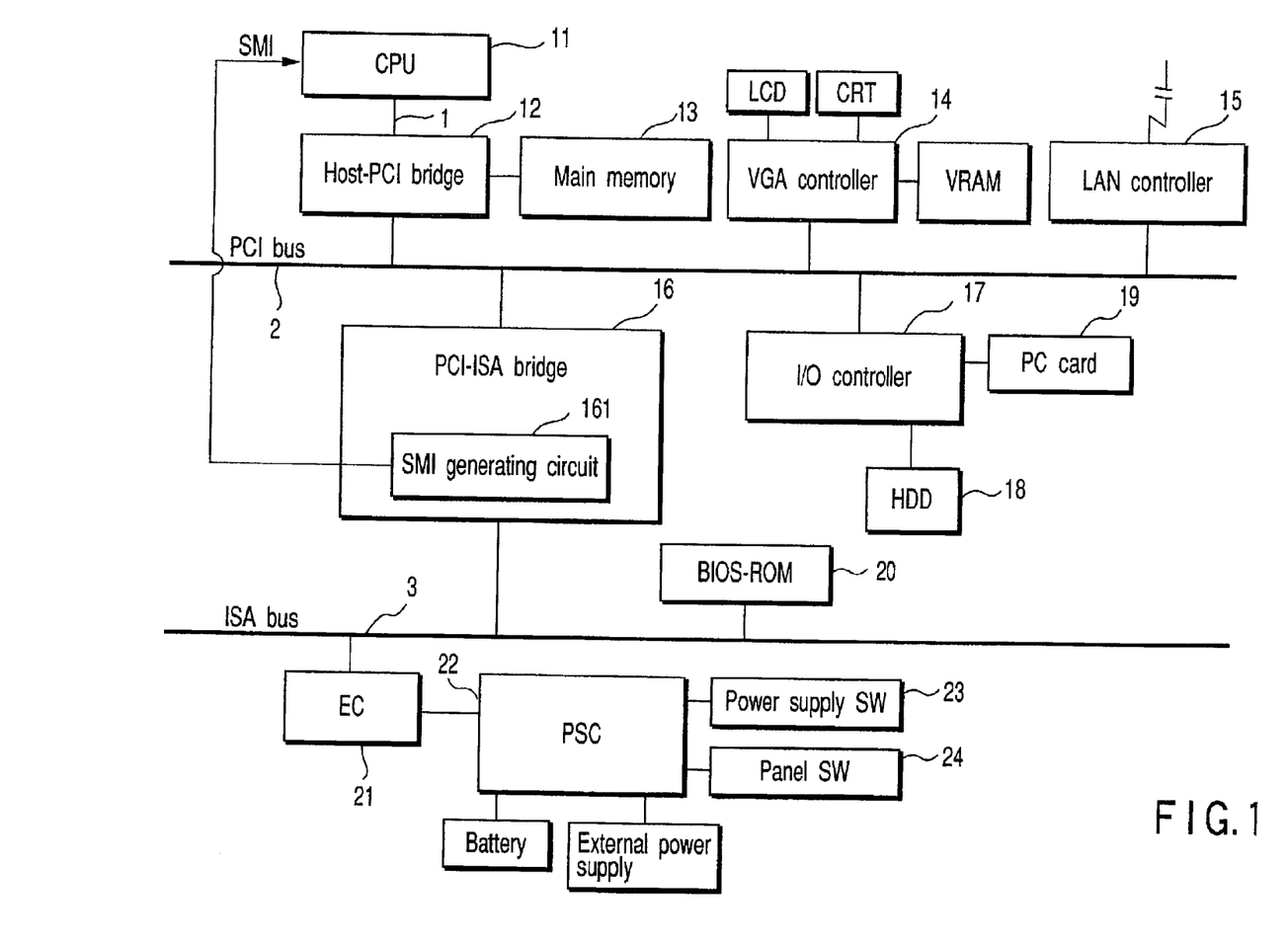
FIG. 1 is a block diagram illustrating a computer system according to the embodiment of the present invention.

FIG. 1 shows an information processing system according to the embodiment of the present invention. The information processing system is a computer system realized in the form of, for example, a notebook-type or sub note-type personal computer. This system comprises a main body and an LCD panel unit openably and closably attached to the main body.

This computer system has a built-in battery and is designed to be operable using power supplied from the battery. The computer can also receive power supplied from an external power supply, such as AC commercial power, via an AC adaptor. When the system receives power from the external power supply, the power is used as computer system operating power. At this time, the built-in battery is automatically charged with the power from the external power supply. When the AC adaptor is disconnected from the system or the breaker for the AC commercial power is actuated, power from the built-in battery is used as the operation power of the computer system.

The computer is provided with a CPU 11, a host-PCI bridge 12 for connecting a CPU bus 1 to a PCI bus 2, a main memory 13, a VGA controller 14, a LAN controller 15, a PCI-ISA bridge 16, an I/O controller 17, a hard disk drive (HDD) 18, a PC card 19, a BIOS-ROM 20, an embedded controller (EC) 21 and a power supply controller (PSC) 22, etc.

The CPU 11 controls the system and executes data processing. The CPU 11 consists of, for example, a processor for supporting a system management interrupt SMI. In this case, the CPU 11 has a system management function as described below.

The CPU 11 has real mode, protect mode and virtual 8086 mode as normal operation modes for executing programs such as an application program and an operating system (OS), etc. The CPU 11 also has an operation mode dedicated to system management, called "system management mode (SMM)".

In the real mode, a memory space of, at maximum, 1 M_byte can be accessed. A logical address can be converted into a physical address by address calculation for determining the physical address using an offset value from a base address that is represented by a segment register.

In the protect mode, a memory space of, at maximum, 4 G_bytes can be accessed per one task. A linear address is determined using an address mapping table called a "descriptor table". This linear address is converted into a final physical address by paging.

Thus, different memory addressing methods are employed in the protect mode and the real mode.

System management mode (SMM) is pseudo real mode. The address calculation method employed in the SMM is the same as that employed in the real mode, in which no descriptor table is referred to, and no paging is executed. However, in the SMM, a memory space greater than 1 M_byte can be accessed.

When a system management interrupt (SMI) has been issued to the CPU 11, the operation mode of the CPU 11 is switched from the real mode, the protect mode or the virtual 8086 mode currently assumed, to the SMM. When the mode has been switched to the SMM on the basis of the SMI, the CPU 11 saves the CPU status currently stored in the CPU register, in an overlay memory (called an "SMRAM") included in the main memory 13. Further, when a resume command (RSM) has been executed in the SMM, the CPU 11 restores the CPU status from the SMRAM to the CPU register, thereby restoring the operation mode assumed before the occurrence of the SMI. In this embodiment, in the SMM, BIOS system management programs (such as a suspend process routine and a resume process routine, etc.) are executed. The suspend process routine of the BIOS is used for switching the system state from the operation state to the suspend state (power save mode) by the cooperation of the OS. In this routine, system data including the CPU context and the states of various devices, etc. is saved in the main memory 13, and then almost all devices except for the main memory 13 are powered off (memory suspend state). The resume routine is used for resuming the operating environment of the system at the point at which execution was suspended, by the cooperation of the OS and the BIOS. In the memory suspend state, when a wakeup event has occurred, the system data saved in the main memory 13 is restored to the CPU 11 and the devices.

The SMI is a kind of non-maskable interrupt NMI, and is a hardware interrupt of a top priority higher than a usual NMI. The issue of the SMI enables the BIOS to be activated irrespective of the environment of the operating system that currently operates.

The host-PCI bridge 12 is a bridge for bi-directionally connecting the CPU bus 1 to the PCI bus 2, and contains a memory controller for controlling the main memory 13. The main memory 13 is used as the main memory, i.e. the system memory, of the information processing system, and stores the operating system, application programs, and user data created by the application programs, etc. The main memory 13 is formed of a semiconductor memory such as a DRAM.

Figure 2:
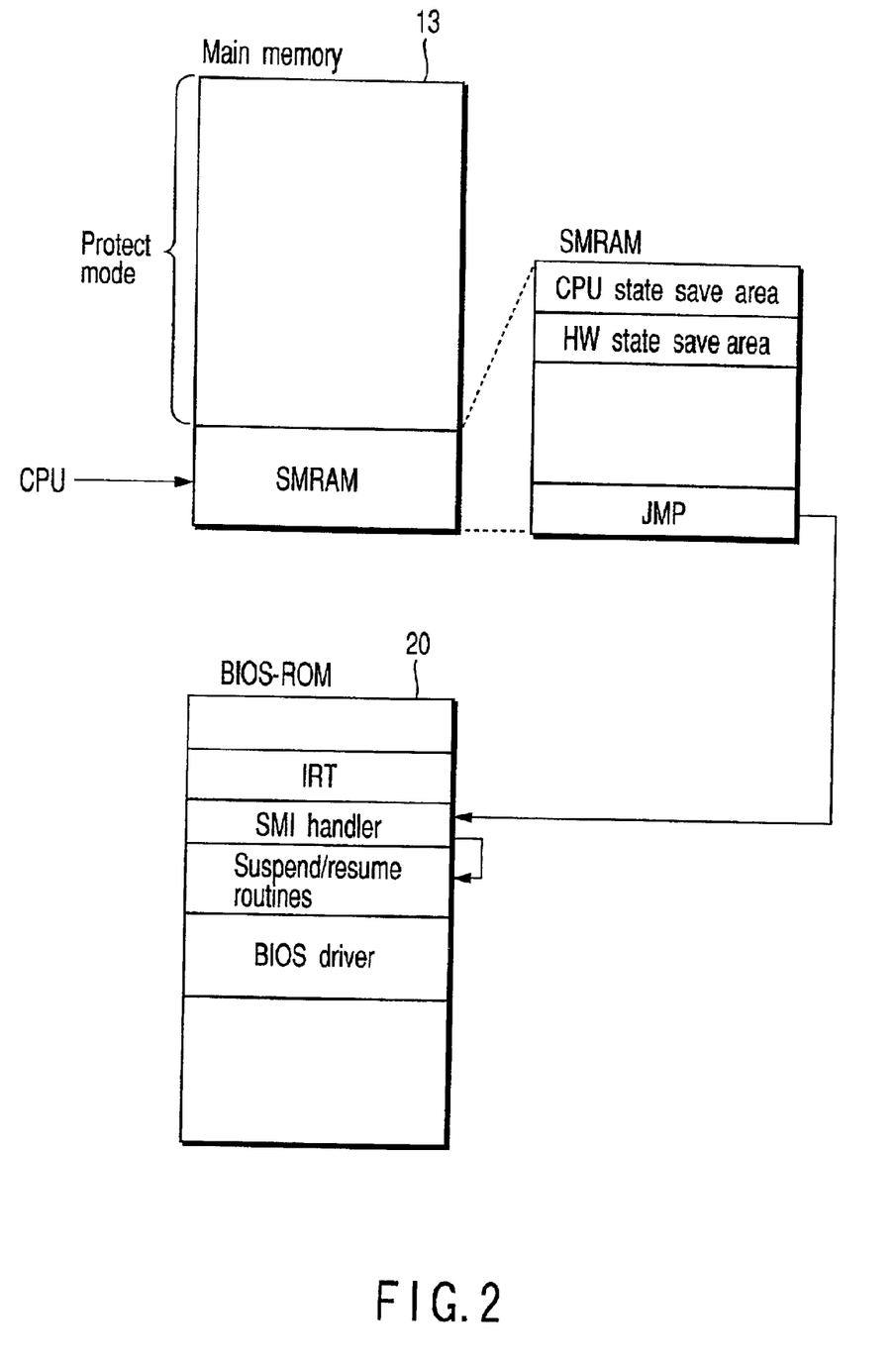
FIG. 2 is a view useful in explaining an example operation of activating a BIOS resume routine in the system of FIG. 1.

As shown in FIG. 2, the SMRAM (System Management RAM) is the memory space assigned to part of the physical memory that constitutes the main memory 13. Only when an SMI signal has been input to the CPU 11, a memory address is mapped in the SMRAM and hence the SMRAM is accessible. The address range in which the SMRAM is mapped is not fixed but is changed in the 4 G_byte space by a register in the CPU 11, which is called an "SMBASE". The SMBASE register cannot be accessed in any mode other than the SMM.

When the mode of the CPU 11 is shifted to the SMM, the CPU context (the CPU status), i.e., for example, the register contents of the CPU 11 when the SMI has occurred, is saved in the SMRAM in a stacked manner. The SMRAM stores a JUMP command for calling the system management programs from the BIOS-ROM 20. The JUMP command is executed at first when the CPU 11 has shifted to the SMM. As a result of the execution of this command, the BIOS system management programs are started. In the SMM, at first, an SMI handler determines the factor that caused the SMI signal. Then, the SMI handler requests the execution of a service routine included in the system management programs and corresponding to the factor.

The BIOS-ROM 20 is provided for storing the BIOS, and formed of a programmable flash memory. The BIOS consists of systematized function-executing routines for accessing various types of hardware in the system, and designed to be operable in the real mode. The BIOS includes, for example, a POST routine for initializing and testing various devices when the system has been powered on, and BIOS drivers for controlling various types of hardware. Each BIOS driver includes a plurality of function executing routines corresponding to those functions for controlling the hardware. The BIOS-ROM 20 also stores programs to be executed in the SMM, such as the aforementioned system management programs (suspend/resume routines). The SMI handler is one of the system management programs and is used to activate various types of SMI service routines corresponding to various types of SMI causing factors. The aforementioned suspend process routine, for example, can be directly activated by an OS corresponding to the ACPI, without using the SMI.

An EC 21 is a controller for controlling additional functions imparted to the system, and includes a heat control function for controlling, for example, the rotation of a cooling fan in accordance with the peripheral temperature of the CPU, an LED/beep sound control function for informing the user of various states of the system by turning on an LED or using a beep sound, a power sequence control function for controlling the ON/OFF states of the system power supply together with the power supply controller 22, and a power status informing function, etc. The power status informing function and the power supply controller 22 are joined to monitor the occurrence of a wakeup event that will cause the activation of the BIOS resume process routine, thereby informing the event, if any, to the BIOS using the SMI signal. The wakeup event is, for example, the ON state of a power supply switch 23 or a panel switch 24. Even in the memory suspend state, operation power is supplied to the EC 21 and the power supply controller 22, and hence each function of the EC 21 is effective.

The EC 21 has an I/O port for communicating with the BIOS. The BIOS reads or writes data from or into a configuration register in the EC 21 via the I/O port, thereby setting the type of event to be monito red or informed, or reading a status indicating an event occurred. Communication between the EC 21 and the power supply controller 22 is executed via an I2C bus.

The VGA controller 14 is a graphics controller for controlling an LCD used as the display monitor of the system, or an external CRT, and is used to display data, drawn in a video memory (VRAM), on the LCD or the external CRT. The LAN controller 15 is a network interface for connecting the system to a LAN. The I/O controller 17 is an interface to various devices, and includes an IDE interface for controlling the hard disk drive (HDD) 18, and a PCMCIA/CARDBUS interface for controlling the PC card 19, etc.

Figure 3:
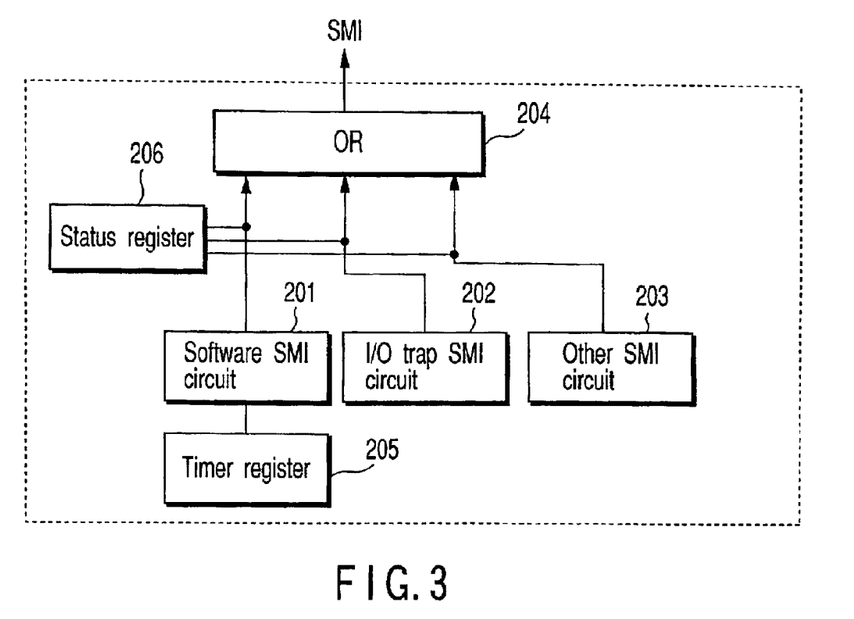
FIG. 3 is a block diagram illustrating an SMI signal generation circuit employed in the system of FIG. 1.

The PCI-ISA bridge 16 is a bridge that bi-directionally connects the PCI bus 2 to the ISA bus 3, and contains an SMI generating circuit 161. As seen from FIG. 3, the SMI generating circuit 161 comprises a software SMI generating circuit 201, an I/O trap SMI generating circuit 202, the other SMI generating circuits 203, an OR circuit 204, a timer register 205 and a status register 206, etc. The software SMI generating circuit 201 generates an SMI signal (a software SMI) at regular intervals set in the timer register 205. The timer register 205 is programmable, which means that intervals selected in accordance with the software used can be set in the register 205. This embodiment uses software SMI to alternately execute resume processing by the BIOS and that by the OS. The status register 206 is provided for holding an SMI causing factor. The register 206 stores information concerning whether an SMI signal supplied to the CPU 11 via the OR circuit 204 is generated from the software SMI generating circuit 201, the I/O trap SMI generating circuit 202 or one of the other SMI generating circuits 203. An event informed by the EC 21 is transferred to the CPU 11 using an SMI signal generated by the other SMI generating circuits 203.

Figure 4:
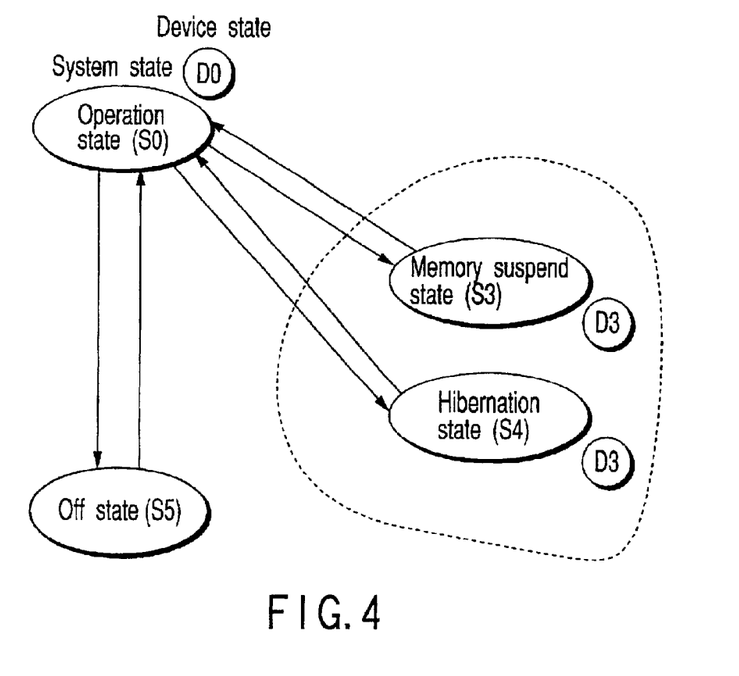
FIG. 4 is a view useful in explaining changes in the state of the system of FIG. 1.

Referring to FIG. 4, the shift of modes in the system of the embodiment will be described.

The system of the embodiment employs a power save mode based on the ACPI. In the ACPI, system states S0–S5 are defined. System state S0 indicates the working state (in which the system is in the ON state, and its software runs). System state S5 indicates the OFF state (in which the system is in the OFF state and no software runs). System states S1≧S4 indicate intermediate states between the working state and the OFF state, i.e. the sleep state (the context of the software immediately before the sleep state is saved, and the software is stopped running in the sleep state). The relationship in the amount of power consumption between these system states is S0>S1>S2>S3>S4>S5. In the embodiment, the system states S3 and S4 are used as a memory suspend state and a hibernation state, respectively.

More specifically, in the system state S3, only the power to the main memory 13 (and part of the chip set) is kept on. Accordingly, the amount of power required is reduced, and the sleep state (power save mode) can be maintained for a long time by the battery. In the system state S4, all the contents of the main memory 13 are saved in the hard disk 18, and all the power supplied to the system is stopped. In this state, the power consumption is minimum among the sleep states (it is equal to that in the system state S5). In other words, the sleep state S4 is the "deepest" sleep state.

Further, in the ACPI, device power states D0–D3 are defined for the management of the power to the devices on the buses. Each device is required to support at least two states D0 and D3. The state D0 is an working state in which each device is completely active, while the state D3 is a sleep state (power saving state) equivalent to the OFF state.

When the system state is shifted from the state S0 to the state S3, i.e. the memory suspend state, the device state of each device is also shifted from its original state (usually, the state D0) to the sleep state D3. The shift to the device state D3 is executed under the control of the OS, while the process of saving the device status (device context) of, for example, a register in a device shifted to the state D3, into the main memory 13 is executed by the BIOS.

Figure 5:
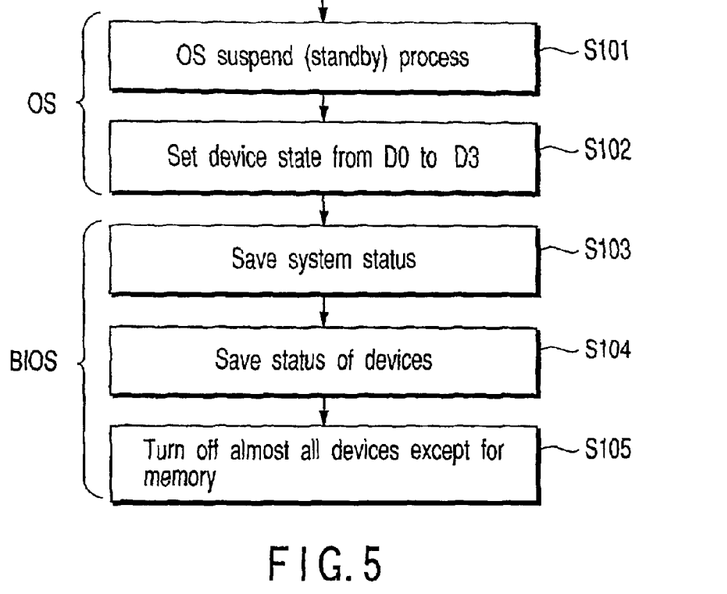
FIG. 5 is a flowchart illustrating the processing executed when the system of FIG. 1 is shifted to memory suspend mode.

Referring then to FIG. 5, a description will be given of the processing executed when the system state is shifted from the operating state S0 to the memory suspend state S3.

When the user has instructed the OS to suspend the system (or to make it standby) by inputting a command or turning off the power switch, the OS starts the processing (OS suspend processing) necessary to suspend, with causing no problems, the current working (step S101). At this stage, the process of saving the current state concerning a network-connecting environment in the main memory 13 or the HDD 18 is also executed. Subsequently, the OS executes the process of shifting the state of each device in the system from the state D0 to the state D3 (step S102). After shifting the states of all the devices to the state D3, the BIOS activates the suspend process routine when a request from the OS is received.

In the suspend process routine, data concerning the status of the system core units such as the CPU 11 and the host-PCI bridge 12, etc. is saved as system data in the main memory 13 (step S103), then the status of each device set in the state D3 are saved in the main memory 13 (step S104). After that, almost all devices except for the main memory 13 (and part of the chip set) are powered off (step S105).

Figure 6:
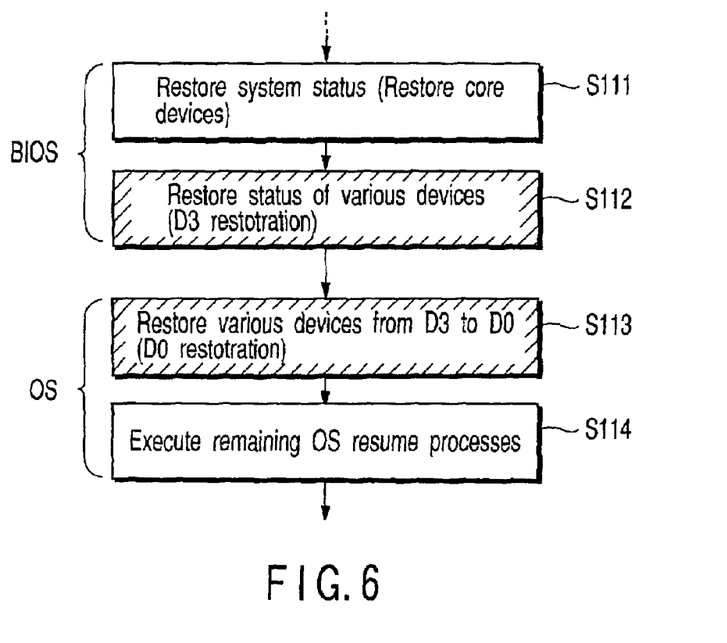
FIG. 6 is a flowchart illustrating the processing executed when the system of FIG. 1 is restored from the memory suspend mode.

Referring now to FIG. 6, a description will be given of the processing executed when the system state is returned from the memory suspend state s3 to the working state S0.

When a wakeup event, such as the user turning on the power supply switch 23, has occurred in the system state S3, power supply to the core units and the other devices is started under the control of the EC 21, and an SMI signal for indicating the occurrence of the wakeup event is issued from the EC 21 to the CPU 11. As a result, the BIOS resume routine is executed. In the BIOS resume routine, at first, the system data saved in the main memory 13 is restored to the core devices such as the CPU 11 and the host-PCI bridge 12, etc., thus executing the restoration processing of the core units (core device restoration processing) at least necessary to operate the OS (step S111). Subsequently, the data of each device saved in the main memory 13 is restored to thereby execute processing for restoring each device to the state D3 (D3 restoration processing) (step S112). This D3 restoration processing at step S112 is executed in parallel to processing (D0 restoration processing) at step S113 for restoring each device from the state D3 to the state D0. The OS executes the D0 restoration processing. After all the devices are restored to the state D0, the OS executes the remaining resume processing for restoring its working environment to that assumed before the memory suspend state (step S114). Specifically, at this step, for example, the reconnection of the system to a network, or restoration processing of any option device that is not managed by the BIOS is executed.

Thus, the resume processing of a plurality of devices is executed in two stages—the D3 restoration process and the D0 restoration process. In this embodiment, the D3 restoration process and the D0 restoration process are executed in a parallel manner.

Figure 7A:
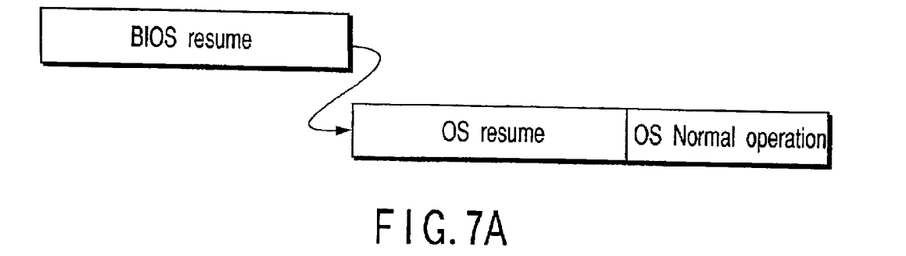
FIGS. 7A and 7B are views useful in explaining BIOS resume processing and OS resume processing executed in the system of FIG. 1.
Figure 7B:
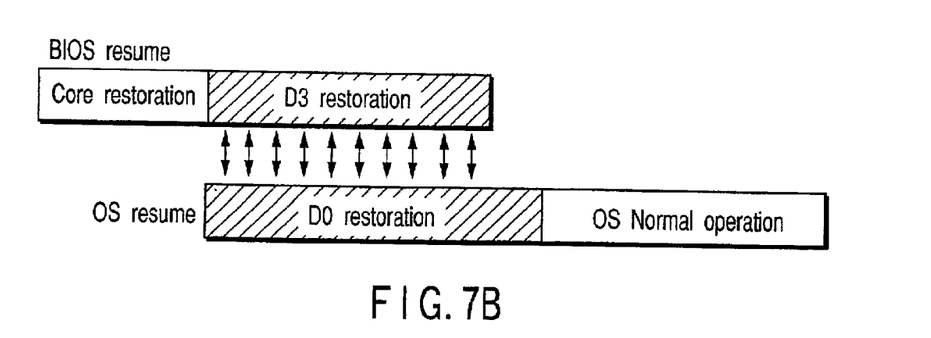

FIGS. 7A and 7B are views useful in explaining the principle of the parallel process. FIG. 7A shows a usual sequential process, and FIG. 7B shows the parallel process according to the embodiment. As is evident from FIG. 7B, in the embodiment, the resume process executed by the BIOS is divided into the restoration process of the core devices and the D3 restoration process of the other devices. The resume process by the OS is started after the restoration process of the core devices is completed. The D3 restoration process by the BIOS is executed using an interrupt process in which, for example, a software SMI is periodically issued during the execution of the D0 restoration process by the OS. As a result, the D3 restoration process and the D0 restoration process are alternately executed using the time-sharing system. This method can shorten the time required for the entire resume process, compared to the serial-type process in which the D0 restoration process is started after all the devices are subjected to the D3 restoration process.

Figure 8:
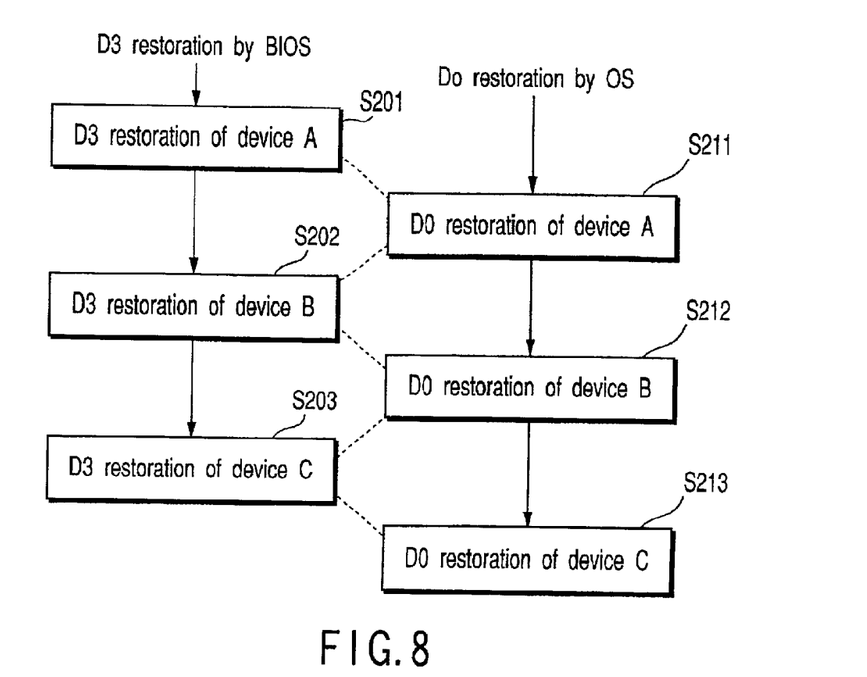
FIG. 8 is a view illustrating D3 restoration processing and D0 restoration processing executed in the system of FIG. 1 in a parallel manner.

FIG. 8 is a view useful in explaining the parallel process of the D3 restoration process and the D0 restoration process.

Specifically, FIG. 8 shows a case where the BIOS executes the D3 restoration process on devices A, B and C in this order (steps S201, S202 and S203), and the OS sequentially executes the D0 restoration process on the devices A, B and C immediately after the D3 restoration process on each device is completed (steps S211, S212 and S213). The D3 restoration process is executed prior to the D0 restoration process to ensure reliability of the latter. Therefore, the sequential execution of the D0 restoration process on devices, beginning from the device first subjected to the D3 restoration process, as is shown in FIG. 8, enables each device to be restored to the D0 state without causing any problems.

Figure 9:
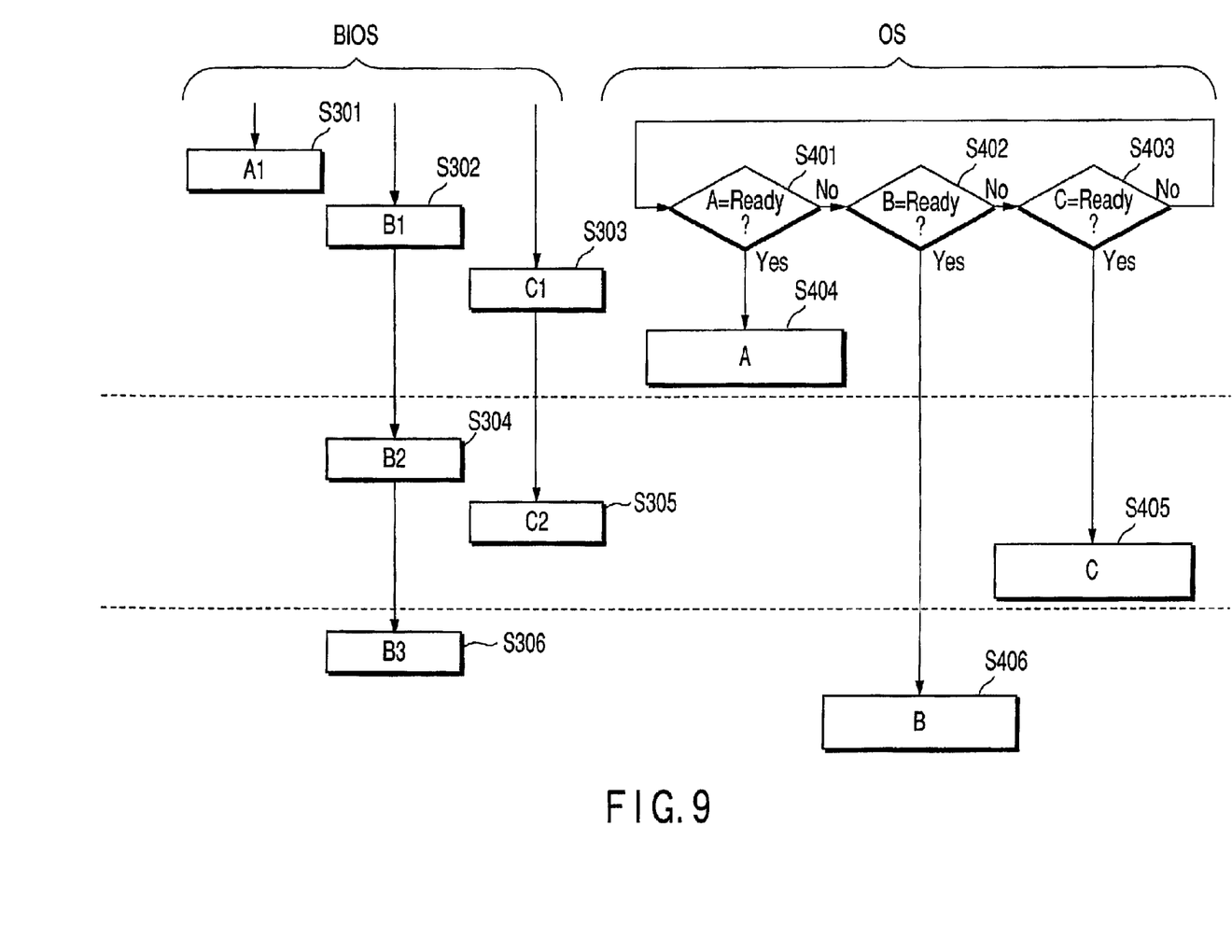
FIG. 9 is a view illustrating D3 restoration processing executed in the system of FIG. 1 on a plurality of devices in a parallel manner.

In each of the D3 restoration process and the D0 restoration process, a command for setting, for example, a register value, is sequentially supplied to the devices. Further, whenever a command is issued, a waiting time (I/O wait) is required until a response from each device occurs. Accordingly, if a device is processed during a waiting time (I/O wait) concerning another device, the resume process can be performed more efficiently. To this end, in the embodiment, the D3 restoration process is executed on a plurality of devices in a parallel manner. FIG. 9 shows this process.

In the case of FIG. 9, the D3 restoration process by the BIOS is executed on the devices A, B and C in a parallel manner, and the D0 restoration process by the OS is executed in parallel to the D3 restoration process. Specifically, the BIOS issues a command to the device A (step S301), and also issues a command to the device B while waiting for the finish of a process executed in the device A in response to the command (step S302). Similarly, the BIOS issues a command to the device C while it waits for the finish of a process executed in the device B in response to the command (step S303). This process is executed on each device that has not yet been subjected to the D3 restoration, each time the software SMI switches the system control from the OS to the BIOS. For facilitating the description, FIG. 9 shows a case where the D3 restoration process on the device A is completed by one command process (A1), the D3 restoration process on the device B by three command processes (B1–B3), and the D3 restoration process on the device C by two command processes (C1 and C2).

In the D0 restoration process by the OS, it is checked whether or not the D3 restoration process has been executed on each of the devices A, B and C (steps S401–S403), and the D0 restoration process is executed on each device having been subjected to the D3 restoration process and being currently in a ready state (steps S404–S406). Also in the D0 restoration process, a waiting time (I/O wait) required until a command process is finished occurs. Accordingly, if the software SMI occurs during the time for which the completion of the command process is waited, command processing for restoring a device to the D3 state is executed in parallel to command processing for restoring another device to the D0 state. In other words, concerning the devices A, B and C, parallel command processing is simultaneously executed.

Figure 10:
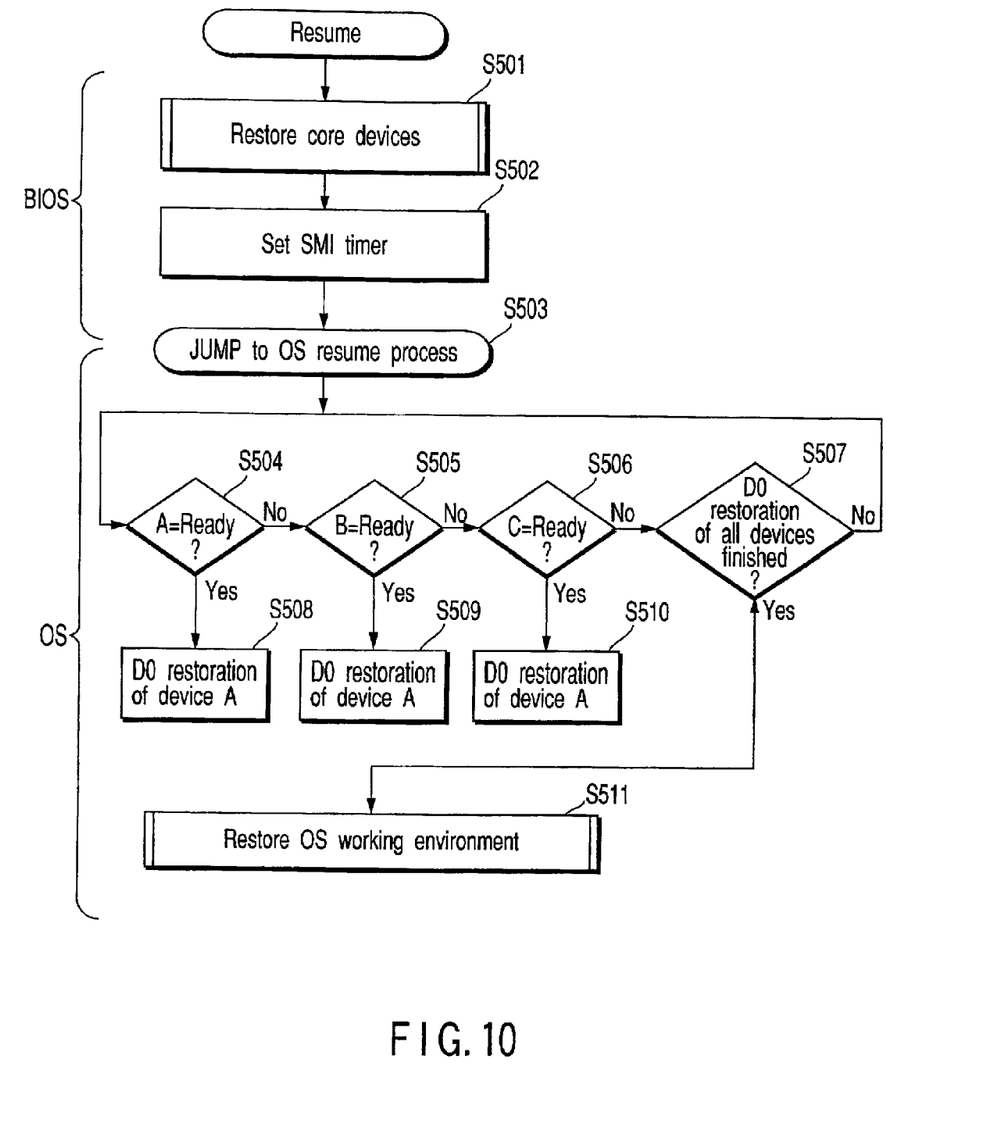
FIG. 10 is a flowchart useful in explaining a procedure of resume processing executed in the system of FIG. 1.

Referring then to the flowchart of FIG. 10, the procedure of the resume process will be described in detail.

The BIOS first executes the restoration process of the core devices, by using the status data saved in the main memory 13 (step S501). After the completion of the core device restoration process, the BIOS sets a predetermined interval timer value (SMI timer) in the timer register 205 for the preparation of the software SMI (step S502). Subsequently, the BIOS executes a jump instruction for calling the start code of the OS resume process stored in the main memory 13, thereby control of system is switched to the OS (step S503).

In the main routine of the resume process, the OS cyclically checks whether or not the D3 restoration process has been executed on each of the devices A, B and C, and whether or not the D0 restoration process has been executed on all the devices (steps S504–S507). The determination as to whether the D3 restoration process is completed is performed by a method for preparing a "busy" status flag for each device, and resetting, by the BIOS, each busy status flag whenever the D3 restoration process has been executed on a corresponding device. In this case, the OS can determine whether or not the D3 restoration process has been executed on a device, simply by checking a busy status flag corresponding thereto.

It is sufficient if the procedure of steps S504–S507 is described in the OS, using, for example, the ASL (ACPI Source Language) as a macro prepared for the ACPI.

The OS issues a command for executing the D0 restoration process to the device first subjected to the D3 restoration process (steps S508–S510). After the D0 restoration process has been executed on all the devices, the OS executes necessary processing such as reconnection of the system to a network (step S511).

Figure 11:
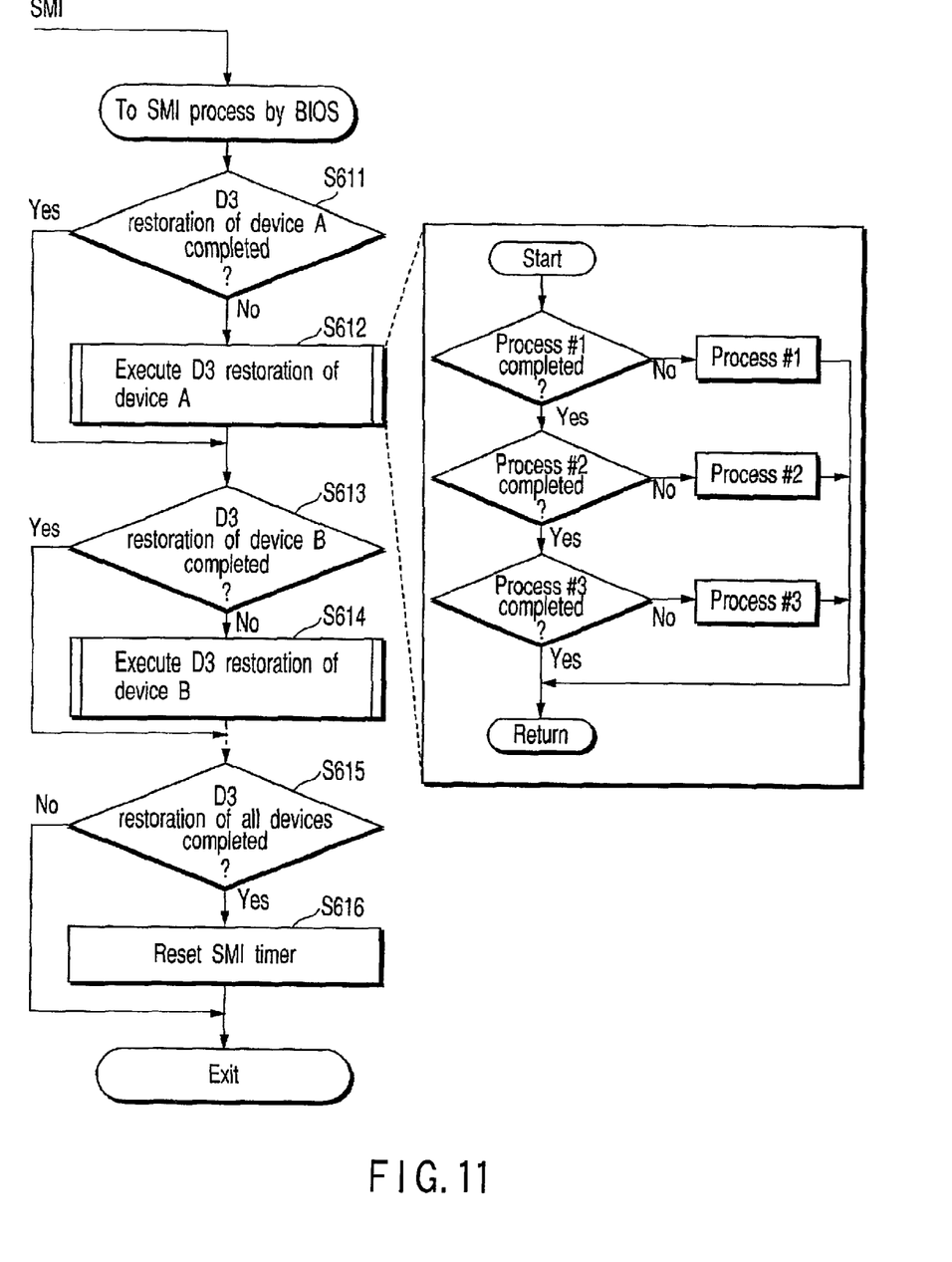
FIG. 11 is a flowchart useful in explaining the procedure of BIOS resume processing executed in the system of FIG. 1.

While the OS resume process is executed, the software SMI is periodically generated. Each time the software SMI is generated, the control of the system is switched from the OS to the BIOS. The BIOS executes the process that is shown in FIG. 11, in SMI interruption processing. At first, the BIOS determines whether or not the D3 restoration process on the device A has been completed (step S611). If it has not yet been completed, the D3 restoration process on the device A is continued (step S612). If three command processes #1, #2 and #3, for example, are necessary for the D3 restoration process of the device A, the BIOS determines at step S612 whether or not each of three command processes #1, #2 and #3 is finished. If it is not finished, it is executed. Each time the BIOS executes one command process, the BIOS exits step S612 and proceeds step S613.

In other words, if the D3 restoration process on the device A is finished, or if one command process has been executed on the device A at step S612, the BIOS determines whether or not the D3 restoration process on the device B is finished (step S613). If it is not finished, the D3 restoration process on the device B is executed (step S614). In a manner similar to that at step S612, it is determined at step S614 whether each command process has been executed. If it has not yet been executed, it is executed. Each time the BIOS executes one command process, it finishes the process at step S614.

After executing the above-described processing on all the devices, the BIOS determines whether or not the D3 restoration process on all the devices has been completed (step S615). If it is not completed, the SMM is finished and the system control is switched from the BIOS to the OS. On the other hand, if the D3 restoration process on all the devices is completed, the interval timer value (SMI timer) in the timer register 205 is reset, thereby stopping the generation of the software SMI (step S615), exiting from the SMM and switching the system control from the BIOS to the OS.

Thus, the D3 restoration process and the D0 restoration process are performed in a parallel manner, by executing alternately the BIOS and the OS.

Figure 12:
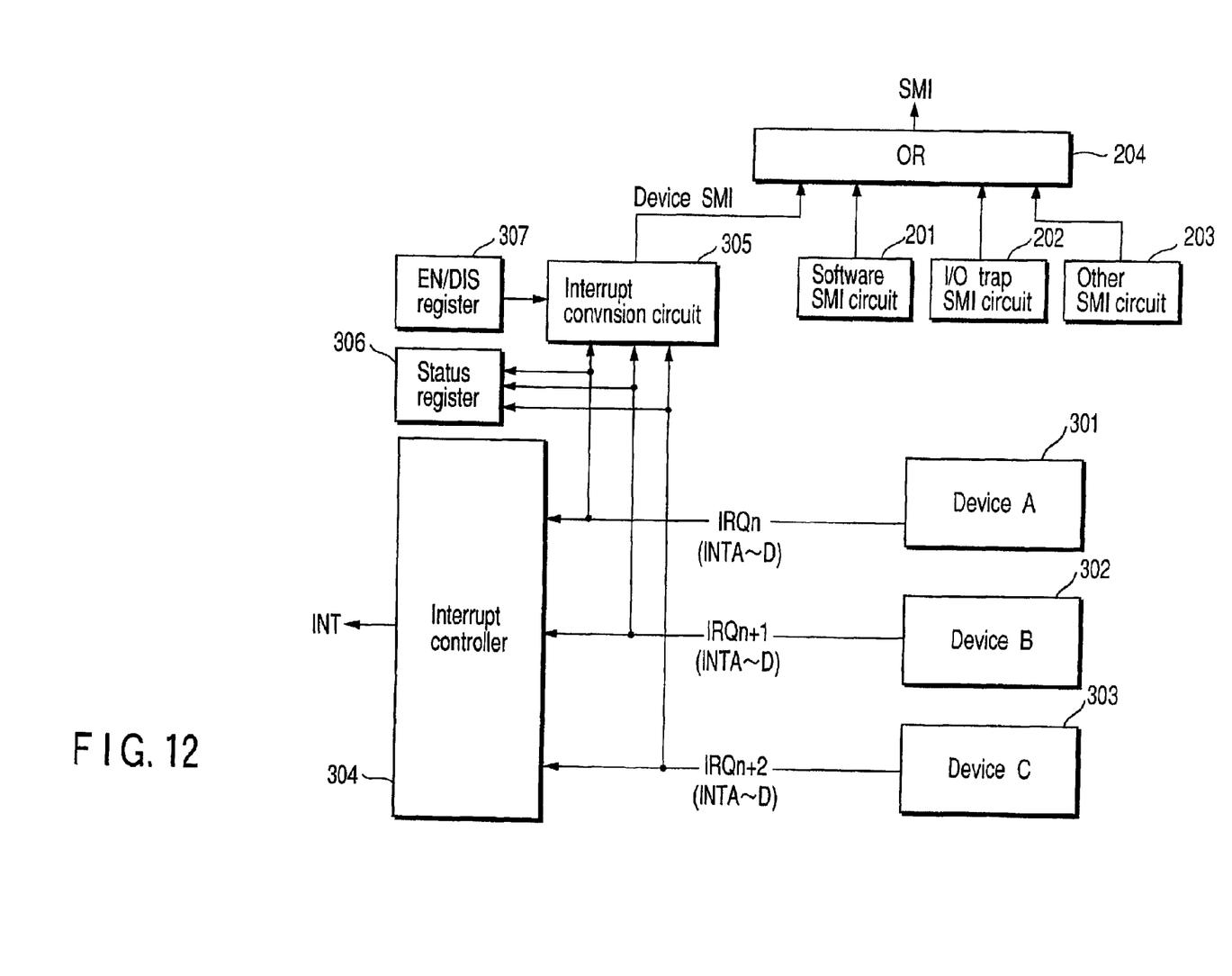
FIG. 12 is a block diagram illustrating an example of hardware assumed when using a device SMI in the system of FIG. 1.

Although in the above embodiment, the OS is switched to the BIOS using the software SMI signal, this switching can also be performed using an interrupt from a device if an interrupt signal from the each device, which indicates the completion of the command processes for the D3 restoration, is converted into the SMI signal. FIG. 12 shows a hardware structure for realizing this method.

As seen from FIG. 12, an interrupt signal (IRQ or INT) output from each device 301–303 is supplied as, for example, a maskable interrupt INTR to the CPU 11 via an interrupt controller 304. To execute the BIOS resume process using an interrupt process without influencing the OS resume process, it is preferable to use the SMM. In light of this, the embodiment employs an interrupt conversion circuit 305, a status register 306 and an enable/disable register 307. The interrupt conversion circuit 305 converts the interrupt signal (IRQ or INT), output from each device 301–303, into an SMI signal, and outputs it as a "device SMI signal" to the OR circuit 204. The conversion operation of the interrupt conversion circuit 305 is permitted or prohibited by a value set in the enable/disable register 307. The device, which outputted an interrupt that caused the present SMI signal, can be determined by referring to the status register 306.

Figure 13:
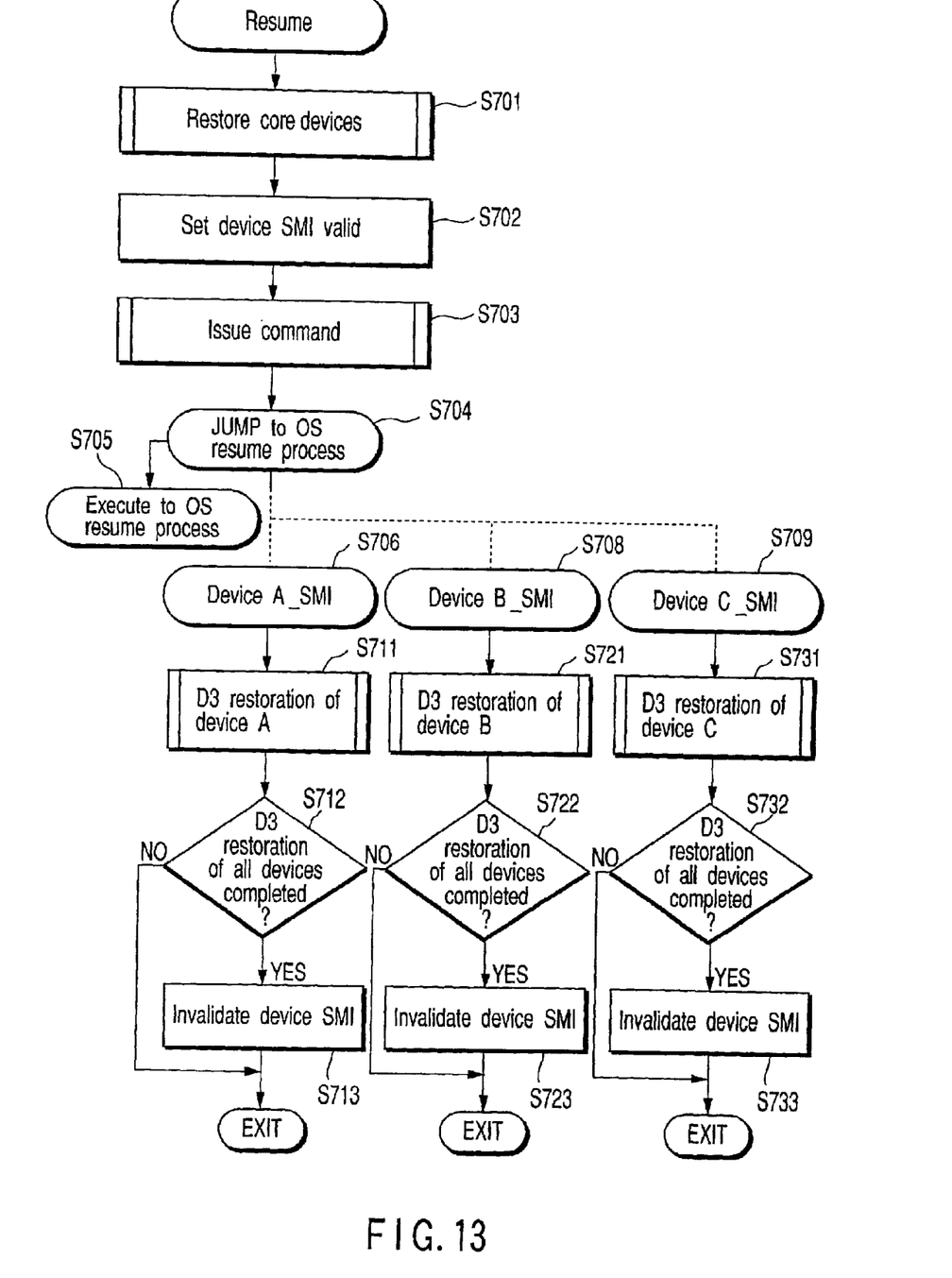
FIG. 13 is a flowchart useful in explaining another procedure of resume processing executed in the system of FIG. 1.

Referring to the flowchart of FIG. 13, the procedure of resume processing executed when using the device SMI will be described.

The BIOS first executes the restoration process of the core devices (step S701). After completing the core device restoration, the BIOS sets an enable flag in the enable/disable register 307, thereby activating the function of generating the device SMI (step S702). Subsequently, the BIOS issues a command necessary for the D3 restoration process to each of the devices A, B and C (step S703). Subsequently, the BIOS executes a jump instruction for calling the start code of the OS resume process stored in the main memory 13, thereby control of system is switched to the OS (step S704). As a result, resume processing by the OS is started (step S705). In the OS resume process, a process as executed at steps S504–S511 in FIG. 10 is performed. However, in this case, since an interrupt signal output from each device is used as the device SMI for activating the BIOS resume processing. In the OS resume process, the determination as to whether or not command processes for the D0 restoration of a device have been finished is executed by polling the device.

When an interrupt signal has been output from a device, for which command processes for the D3 restoration are finished, a device SMI is generated to activate the BIOS. With reference to the status register 306, the BIOS determines whether the device SMI is related to the device A (a device A_SMI), the device B (a device B_SMI) or the device C (a device C_SMI). The BIOS includes SMI process routines corresponding to the devices A, B and C, and executes the SMI process routine associated with the device indicated by the device SMI.

In the case of the SMI process routine corresponding to, for example, the device A, a command necessary for the D3 restoration of the device A is issued (step S711). Subsequently, it is determined whether or not the D3 restoration process on all the devices has been finished (step S712). If it is not finished, the SMM is finished and the system control is switched from the BIOS to the OS. On the other hand, if the D3 restoration process on all the devices is finished, the enable flag of the enable/disenable register 307 is reset, thereby invalidating the device SMI (step S712), exiting from the SMM and switching the system control from the BIOS to the OS. In the SMI process routine corresponding to the device B, similar processes (steps S721–S723) are executed. Also in the SMI process routine corresponding to the device C, similar processes (steps S731–S733) are executed.

As described above, in the resume processing of the embodiment, the BIOS resume process and the OS resume process are executed in a parallel manner to increase the speed of the resume process.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An information processing system capable of resuming an operation, by using system data saved in a memory immediately before the system was suspended, the system comprising:

means, responsive to occurrence of a wakeup event while the system is in a suspended state, for causing a BIOS program to execute a resume sub-process to restore an operation environment of a system core necessary to operate an operating system, the resume sub-process being included in a first resume process executed by the BIOS program;

means, responsive to completion of the resume sub-process, for causing the operating system to start execution of a second resume process for restoring an operating environment of each of devices other than the system core; and means for inserting interrupt processes in which the BIOS program executes a remaining resume sub-process of the first resume process, into the second resume process, so as to execute the remaining resume sub-process and the second resume process in a parallel manner, the remaining resume sub-process including a preprocess for enabling the devices to be subjected to the second resume process.

2. The information processing system according to claim 1, wherein the interrupt processes inserting means includes means for issuing an interrupt signal to a CPU of the information processing system at predetermined regular time intervals to thereby insert the interrupt processes.

3. The information processing system according to claim 1, further comprising means for causing the operating system to determine whether or not the preprocess has been executed on each of the devices, thereby prohibiting execution of the second resume process on any device that has not yet been subjected to the preprocess.

4. The information processing system according to claim 1, wherein in the preprocess, commands necessary to restore the devices to a state in which the second resume process can be executed, are sequentially issued to the devices.

5. The information processing system according to claim 1, wherein in the preprocess, commands necessary to restore the devices to a state in which the second resume process can be executed, are sequentially issued to the devices, and the interrupt processes inserting means includes means, that is responsive to an interrupt, output from each of the devices and indicating completion of a process based on the command, for issuing an interrupt signal for inserting each of the interrupt processes, to a CPU of the information processing system.

6. An information processing system comprising:

a plurality of devices;

means, responsive to occurrence of an power down event for suspending the operation of the system, for shifting a state of the devices from an working state to a sleep state;

means for saving status data of the devices shifted to the sleep state in a memory incorporated in the information processing system, and then making the information processing system enter a sleep mode;

first resume means, responsive to occurrence of a wakeup event indicating that the information processing system should be restored from the sleep mode, for restoring the devices to the sleep state using the status data saved in the memory;

second resume means for restoring the devices restored to the sleep state, to the working state; and control means for operating the first resume means and the second resume means in a parallel manner so that restoration of the devices to the working state can be sequentially started, beginning from that one of the devices, which has been first restored to the sleep state.

7. The information processing system according to claim 6, wherein the second resume means includes means for determining whether or not each of the devices has been restored to the sleep state, and means for sequentially starting restoration of the devices to the working state, beginning from that one of the devices, which has been first restored to the sleep state.

8. The information processing system according to claim 6, wherein the control means alternately operates the first and second resume means at regular intervals, using an interrupt signal output from a timer.

9. The information processing system according to claim 6, wherein the first resume means includes means for sequentially issuing each of commands, necessary for restoring the devices to the sleep state, to a corresponding one of the devices, so that processes based on the commands can be executed on the devices in a parallel manner.

10. The information processing system according to claim 6, wherein:

the first resume means includes means for sequentially issuing each of commands, necessary for restoring the devices to the sleep state, to a corresponding one of the devices, so that processes based on the commands can be executed on the devices in a parallel manner; and the control means includes means for monitoring an interrupt signal that is output from each of the devices and indicates completion of a command process on said each of the devices, and means for switching resume means from the second resume means to the first resume means each time occurrence of the interrupt signal is detected, in order to enable a next command to be issued to said each of the devices having been subjected to the command process.

11. A method of executing a resume process for resuming an operation of an information processing system, by using system data saved in a memory immediately before the system was suspended, the method comprising:

causing a BIOS program to execute, in response to occurrence of a wakeup event while the system is in a suspended state, a resume sub-process to restore an operation environment of a system core necessary to operate an operating system, the resume sub-process being included in a first resume process executed by the BIOS program;

causing the operating system to start execution of a second resume process for restoring an operating environment of each of devices other than the system core, upon completion of the resume sub-process; and inserting interrupt processes in which the BIOS program executes a remaining resume sub-process of the first resume process, into the second resume process, so as to execute the remaining resume sub-process and the second resume process in a parallel manner, the remaining resume sub-process including a preprocess for enabling the devices to be subjected to the second resume process.

12. The method according to claim 11, wherein the interrupt processes inserting includes issuing an interrupt signal to a CPU of the information processing system at predetermined regular time intervals to thereby insert the interrupt processes.

13. A method of resuming an operation of an information processing system including a plurality of devices, the method comprising:

shifting a state of the devices from an working state to a sleep state in response to occurrence of an power down event for suspending the operation of the system;

saving status data of the devices shifted to the sleep state in a memory incorporated in the information processing system, and then making the information processing system enter a sleep mode;

executing a first resume process for restoring the devices to the sleep state using the status data saved in the memory, in response to occurrence of a wakeup event indicating that the information processing system should be restored from the sleep mode; and executing a second resume process for restoring the devices restored to the sleep state, to the working state, wherein the first resume process and the second resume process are alternatively executed so that restoration of the devices to the working state can be sequentially started, beginning from that one of the devices, which has been first restored to the sleep state.

14. The method according to claim 13, wherein the executing the first resume process includes sequentially issuing commands, necessary for restoring the devices to the sleep state, to a corresponding one of the devices, so that processes based on the commands can be executed on the devices in a parallel manner.

15. An information processing system having a plurality of devices operating as system functions, in which an operating system and a BIOS program are executed, the information processing system comprising:

means for causing the BIOS program to execute a resume process including a first resume process for restoring an operation environment needed to operate the operating system, in response to occurrence of a wake up event while the information processing system is in a suspend state; and means for causing the operating system to execute a second resume process for restoring the operation environment of each of the plurality of devices, before the end of the resume process executed by the BIOS program.

* * * * *

UNITED STATES PATENT AND TRADEMARK OFFICE
CERTIFICATE OF CORRECTION

PATENT NO. : 6,832,311 B2
DATED : December 14, 2004
INVENTOR(S) : Morisawa

It is certified that error appears in the above-identified patent and that said Letters Patent is hereby corrected as shown below:

Column 12,
Line 25, change "an power" to -- a power --.
Line 27, change "an working" to -- a working --.

Column 14,
Line 1, change "an working" to -- a working --.
Line 2, change "an power" to -- a power --.

Signed and Sealed this

Twelfth Day of April, 2005

JON W. DUDAS
*Director of the United States Patent and Trademark Office*